United States Patent [19]

Futami et al.

[11] Patent Number: 5,116,283
[45] Date of Patent: May 26, 1992

[54] POWER TRANSMISSION MECHANISM WITH TWO SETS OF CHAINS

[75] Inventors: Yuichi Futami, Iruma; Eisaku Ohmon, Tokorozawa; Tadasu Suzuki, Tokyo, all of Japan

[73] Assignee: Tsubakimoto Chain Co., Osaka, Japan

[21] Appl. No.: 689,698

[22] Filed: Apr. 19, 1991

[30] Foreign Application Priority Data

Apr. 20, 1990 [JP] Japan .................. 2-41586[U]

[51] Int. Cl.⁵ .................................. F16H 7/00
[52] U.S. Cl. ............................. 474/84; 474/101
[58] Field of Search ............ 474/160, 153, 84–89, 474/101

[56] References Cited

U.S. PATENT DOCUMENTS

| | | | |
|---|---|---|---|
| 3,949,619 | 4/1976 | Kuehl | 474/85 X |
| 4,044,633 | 8/1977 | Lee | 474/86 X |
| 4,813,917 | 3/1989 | Borden | 474/84 X |

*Primary Examiner*—Thuy M. Bui
*Attorney, Agent, or Firm*—Flynn, Thiel, Boutell & Tanis

[57] ABSTRACT

A chain-type power transmission mechanism, having first and second sets of sprockets, each set of which has a sprocket provided on both a drive shaft and a driven shaft. A first chain extends over and between the first set of sprockets, and a second chain extends over and between the second set of sprockets. The two sprockets provided on at least one of the shafts are relatively changeable in rotational position whereby the forward side of one chain and the backward side of the other chain are tensioned.

5 Claims, 5 Drawing Sheets

POWER TRANSMISSION MECHANISM WITH TWO SETS OF CHAINS

FIELD OF THE INVENTION

The present invention relates to a power transmission mechanism with two sets of chains for transmitting a turning force of a drive shaft to a driven shaft of which load torque is varied.

BACKGROUND OF THE INVENTION

To transmit a turning force from a drive shaft to a driven shaft, a power transmission mechanism comprising sprockets and a chain has been conventionally used. In this power transmission mechanism, when a chain is extended over sprockets, the distance between drive and driven shafts is forcibly extended to apply initial tension to both forward and backward sides (i.e., reaches) of the chain so that looseness of the chain is eliminated, and even if the load torque of the driven shaft is varied to be positive and negative, the chain is not vibrated. Here, the forward side of the chain is the side on which the chain is moved in the direction from the driven shaft to the drive shaft during circulating movement of the chain, whereas the backward side is the side on which the chain is moved in the direction from the drive shaft to the driven shaft. The positive load torque is the load by which the forward side of the chain is tensioned, whereas the negative load is the load by which the backward side of the chain is tensioned.

However, the power transmission mechanism of the type as described has problems in that the assembling operation for applying initial tension is difficult, and elongation caused by wear occurs in both forward and backward sides of the chain as a result of use for a long period (the whole periphery of the chain elongates), and when the chain vibrates, the chain can rupture.

To cope with such problems as noted above, the chain is normally engaged by a tensioner so as to eliminate looseness in the chain. In this case, however, there involves another problem in that space for installing the tensioner is limited, and the tensioner increases the cost.

The above-described problems are believed solved by the present invention which provides a power transmission mechanism with two sets of chains, having first and second sets of sprockets, each pair of which is provided on a drive shaft and a driven shaft, a first chain extended over the first set of sprockets, a second chain extended over the second set of sprockets, and the two sprockets provided on at least one of said shafts being relatively changeable in rotational position thereof, whereby the forward side of one chain and the backward side of the other chain are tensioned.

Since the forward side of one chain and the backward side of the other chain are tensioned, even if positive and negative loads occur due to a variation of load torque, the positive load can be received by the chain of which a forward side is tensioned while the negative load can be received by the chain of which a backward side is tensioned. Accordingly, the tensioned side of either chain receives the load in response to the variation of the load torque whereby it is hard to vibrate the chain even if a variation of the load torque occurs, and even if the construction of a tensioner is simple or even if a tensioner is not used, a stabilized running of the chain can be obtained. Moreover, since the initial tension is applied merely to the tensioned side of each chain, the whole elongation due to wear of the chain decreases.

DETAILED DESCRIPTION

In the following, embodiments of the present invention will be described with reference to the drawings.

Figure 3:
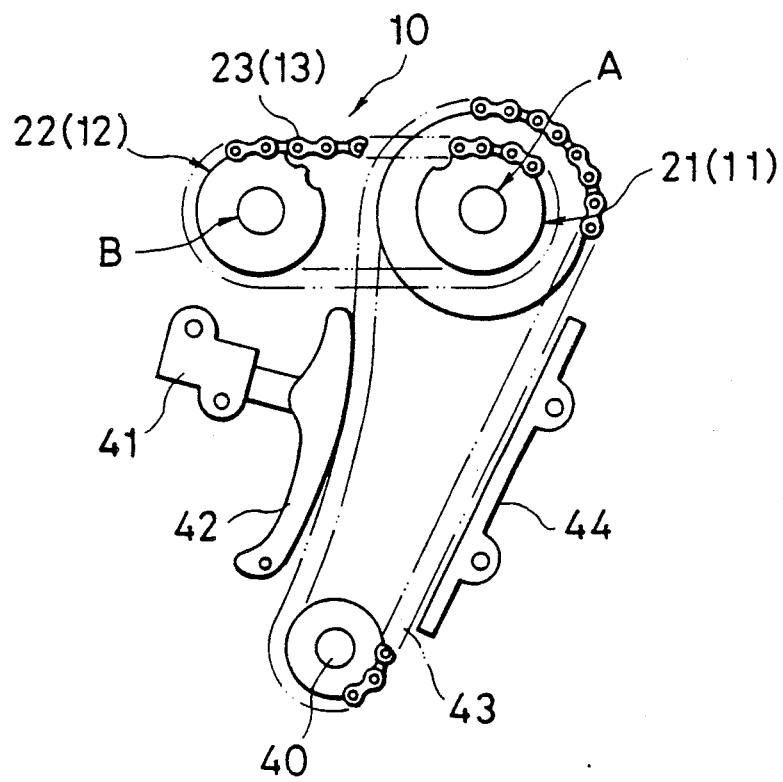
FIG. 3 is a schematic view wherein the power transmission mechanism of the present invention is provided in a power transmission portion of a cam shaft drive of an engine.

As shown in FIG. 3, a power transmission mechanism 10 transmits, for example, a turning force of a crank shaft 40 of an automobile from a first cam shaft A to a second cam shaft B. The cam shafts A and B function to open and close engine valves. In FIG. 3, 41 designates a tensioner for urging an oscillatable chain guide 42 against a chain 43, and 44 is a fixed chain guide.

The power transmission mechanism 10 comprises a pair of first and second sprockets 11, 21 on the drive side provided on the drive shaft A (FIG. 1) which is a first cam shaft, a pair of first and second sprockets 12, 22 provided on the driven shaft B which is a second cam shaft, a first chain 13 extended over the first set of sprockets 11 and 12, and a second chain 23 extended over the second set of sprockets 21 and 22.

Figure 2:
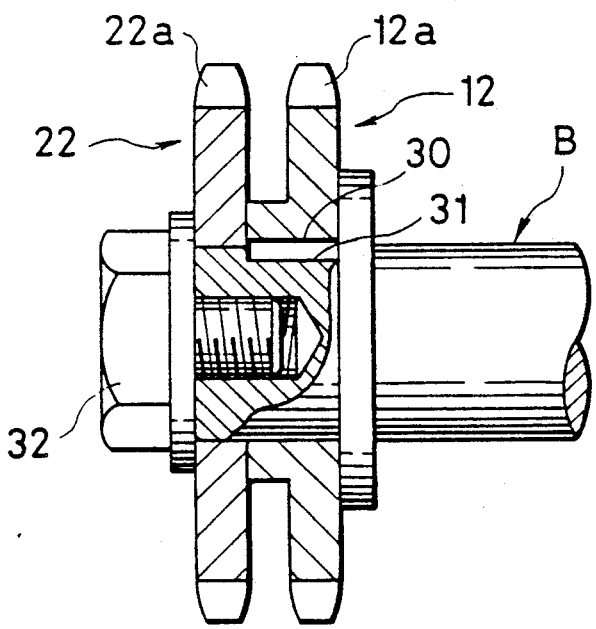
FIG. 2 is a sectional view of a driven shaft side.

The first and second sprockets 11 and 21 on the drive side have the same shape, and the teeth's position are registered (that is, phases are registered) and are mounted by keys and keyways (not shown) on the drive shaft A. The first sprocket 12 on the driven side has the same shape as the second sprocket 22 on the driven side, and is mounted by a key 30 and a keyway 31 on the driven shaft B as shown in FIG. 2. However, the second sprocket 22 on the driven side is mounted on the driven side B by a bolt 32 so that the second sprocket 22 may be adjusted in position in the rotational direction.

Next, the order of incorporating the first and second chains 13 and 23 will be described.

First, the bolt 32 is untightened to render the second sprocket 22 on the driven side rotatable relative to the shaft B. The first chain 13 is extended over the first set of sprockets 11 and 12, and the second chain 23 is extended over the second set of sprockets 21 and 22. Next, the drive shaft A and the driven shaft B are alternately rotated outwardly (i.e., in the opposite directions as indicated at arrows C and D in FIG. 1) by hand so that the forward (i.e., top) side 13a of the first chain 13 is tensioned. Thereafter, the drive shaft A is rotated and controlled in the state where the forward side 13a of the first chain 13 remains tensioned, and the second sprocket 22 on the driven side is rotated inwardly (i.e., in the direction indicated at arrow E in FIG. 1) by hand. Thus, the tooth 22a of the second sprocket 22 is deviated in position relative to the tooth 12a of the first sprocket 12 (that is, a deviation in phase), and the backward (i.e., lower) side 23b of the second chain 23 is tensioned. Finally, the bolt 32 is tightened to non-rotatably secure the second sprocket 22 to the driven shaft B. As the result, the first chain 13 is maintained in the state where the forward or top side 13a is tensioned whereas the second chain 23 is maintained in the state where the backward or lower side 23b is tensioned.

The turning force of the drive shaft A is transmitted to the driven shaft B by cooperation between the first and second chains. When the load (positive load) to impede the rotation is applied to the driven shaft B according to the position of the engine valve, the forward side 13a of the first chain 13 receives that load. When the load (negative load) to quicken the rotation of the driven shaft B is applied, the forward side 23b of the second chain 23 receives that load.

Accordingly, since the tensioned side of either chain receives the load according to the variation of the load torque, even if a tensioner of simple construction is used, or even if the tensioner is not provided, a stabilized running of the chain is obtained.

Furthermore, by elimination of the tensioner, sounds produced when the chain beats the tensioner, rubbing sounds or the operating sounds caused by the tensioner itself disappear, and noises can be decreased.

Figure 1:
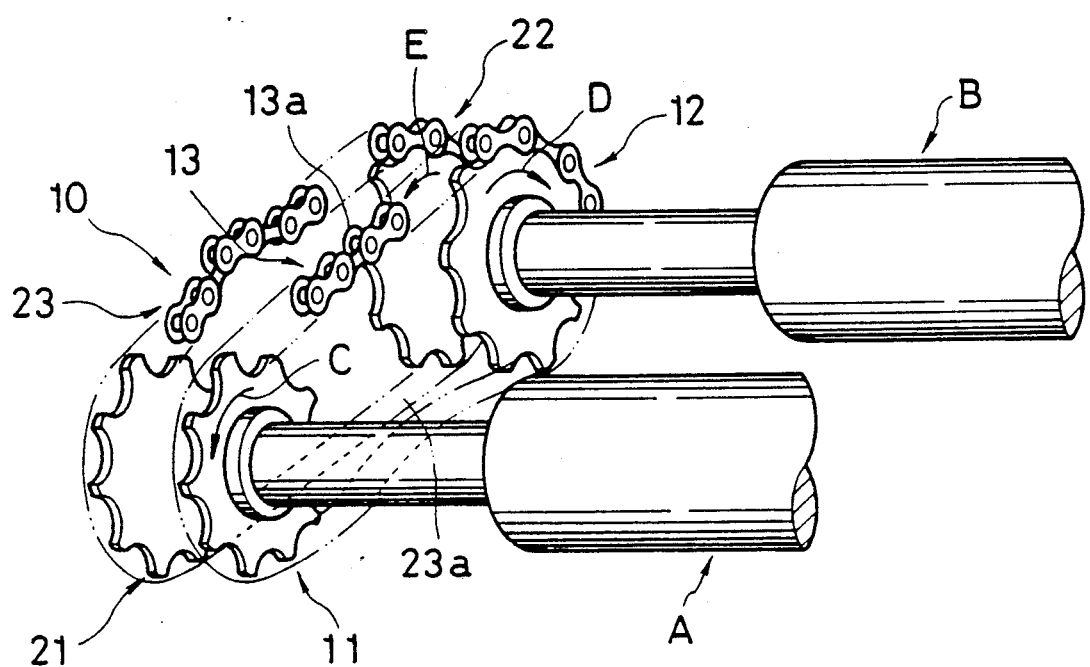
FIG. 1 is a perspective view of a power transmission mechanism according to the present invention.
Figure 4:
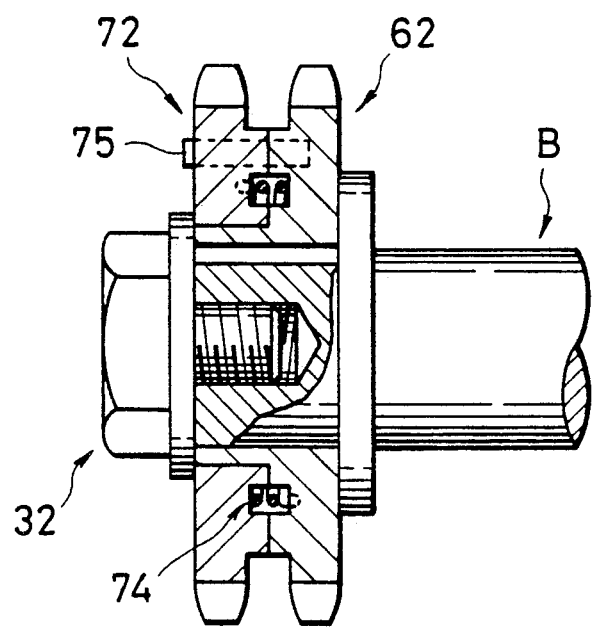
FIG. 4 is a sectional view of a driven shaft side according to another embodiment.

FIG. 4 is a sectional view of a portion of the driven shaft B according to another embodiment wherein a torsion spring 74 is provided between first and second sprockets 62 and 72 on the driven side so that a turning force in the same direction as arrow E in FIG. 1 is applied to the second sprocket 72 by the spring 74 so as to apply tension to the backward side of the second chain. Before the second chain is extended over the second sprocket 72, the relative position between both the sprockets 62 and 72 is restricted by a knockout pin 75 to store the resilient force in the spring 74. The knockout pin 75 is removed after the second chain is extended between the sprockets, and the resilient force is released to rotate the second sprocket 72. Thereafter, the second sprocket 72 is secured to the driven shaft B by tightening of the bolt 32.

Accordingly, according to the construction of FIG. 4, the resilient force of the spring 74 is utilized in order to relatively rotate the second sprocket 72. Therefore, tension can be positively applied to the chain, and the operation for applying the tension is simplified.

Figure 5:
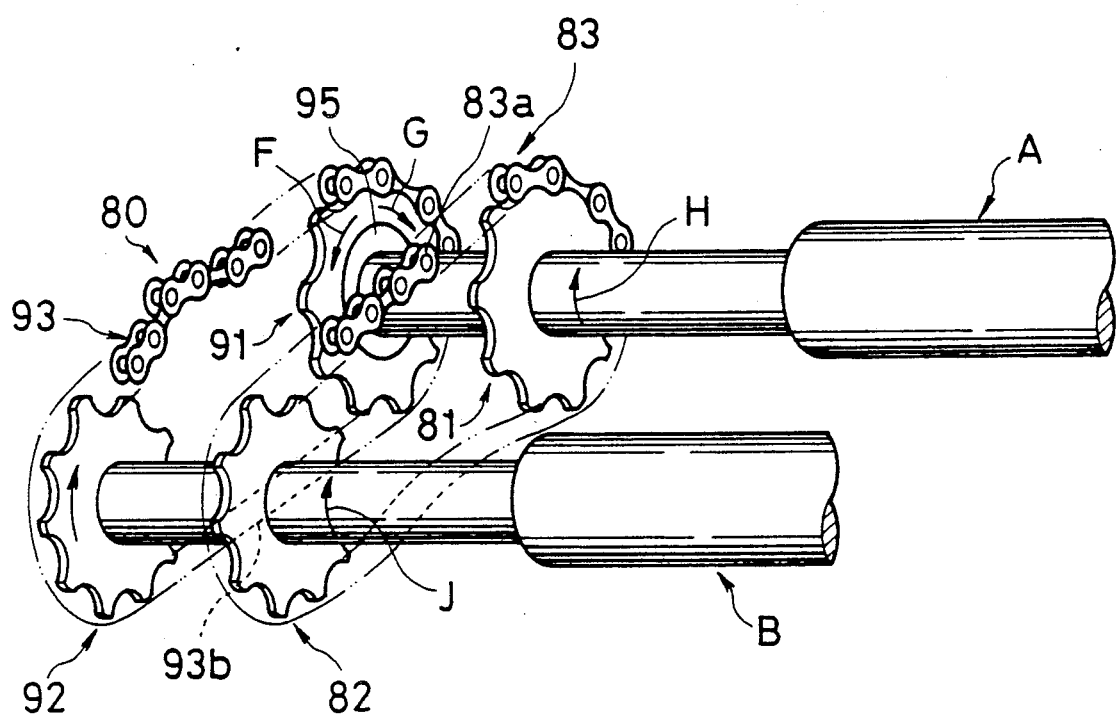
FIG. 5 is a schematic perspective view of a power transmission mechanism according to another embodiment.

A transmission mechanism 80 shown in FIG. 5 comprises first and second sprockets 81 and 91 on the drive side provided on the drive shaft A, first and second sprockets 82 and 92 on the driven side provided on the driven shaft B, a first chain 83 extended over the first set of sprockets 81 and 82, and a second chain 93 extended over the second set of sprockets 91 and 92. The second sprocket 91 on the drive side is provided on the drive shaft A through a one-way clutch 95.

The one-way clutch 95 per se is well known, and details thereof are omitted. If the drive shaft A is held fixed, then the rotation of the second sprocket 91 on the drive side in the direction of arrow F is allowed but the rotation in the direction of arrow G is prevented. Conversely, if that sprocket 91 is held fixed, then the rotation of the drive shaft A in the direction of arrow F is prevented but the rotation is the direction of arrow G is free.

Accordingly, the turning force of the drive shaft A in the direction of arrow H when the positive load is applied to the driven shaft B is transmitted as it is from the sprocket 81 to the first chain 83 but is not transmitted to the sprocket 91 because the one-way clutch 95 is actuated. Accordingly, the first chain 83 assumes the state where the forward side 83a is tensioned. And the turning force transmitted to the sprocket 82 in the direction of arrow J is transmitted as it is to the sprocket 92 so that the sprocket 92 drives the sprocket 91. Thus, the second chain 93 assumes the state where the backward side 93b is tensioned.

Even if a variation of the turning force occurs and a negative load is applied to the driven shaft B, the sprocket 92 still rotates the sprocket 91, and the sprocket 91 causes the sprocket 81 and the drive shaft A to be rotated by the rotation-impeding action of the one-way clutch 95. The sprocket 81 drives the sprocket 82. As the result, the forward side 83a and the backward side 93b of the chains 83 and 93 remain tensioned.

Accordingly, according to the transmission mechanism 80, even if the variation of torque occurs, the tension state of the chain remains unchanged whereby the stabilized running of the chain can always be achieved. In addition, no additional mechanism for applying tension to the chain is required, and even if an elongation due to wear occurs in the chain, the tension state of the chain remains unchanged owing to the function of the one-way clutch. Accordingly, it is possible to prevent vibrations, noises and the degradation of durability caused by the elongation due to wear. Further, there is a feature that the transmission mechanism of this kind free of maintenance can be realized.

While in the above-described embodiments, the first sprocket has the same diameter as that of the second sprocket, it is to be noted that the diameter thereof may be differentiated from each other. That is, suppose that one chain forms a principal drive chain, the other may have a size (pitch) smaller than the former whereby the whole weight of the power transmission mechanism can be reduced.

Furthermore, while the second sprocket on the driven side can be adjusted in position in the rotational direction, it is to be noted of course that the pair of sprockets on the drive side can be adjusted in the relative position, and for both the shafts, the position thereof may be adjusted.

Figure 6:
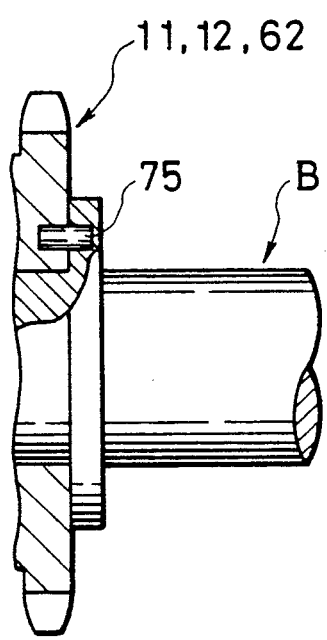
FIG. 6 is a sectional view of another embodiment of how to mount a sprocket.

Moreover, while the first sprocket on the driven and drive sides is secured to the driven side by keys and keyways, it is to be noted that as shown in FIG. 6, it may be secured by the fixed knock pin 75 or the sprocket may be formed integral with the shaft.

In the power transmission mechanism with two sets of chains according to the present invention, the forward side of one chain is tensioned, and the backward side of the other chain is tensioned. Therefore, the following effects are obtained:

(1) It is not necessary to perform a difficult operation by which the distance between the drive shafts and the driven shaft is forcibly extended.

(2) Since the tensioned side of either chain receives the load according to the variation of the load torque, even if the construction of a tensioner is simple or even if the tensioner is not provided, a stabilized running of the chain can be obtained.

(3) Since either forward or backward side of the respective chains is applied with tension, the whole elongation due to wear of the chain is minimized.

(4) Since the tensioner need not be provided, even in the case of a narrow distance between the shafts where no space is available to provide a tensioner, the chain can be driven. Sounds produced when the chain beats the tensioner, rubbing sounds or operating sounds of the tensioner itself disappear, and occurrence of noises can be minimized. Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A chain-type power transmission mechanism for connection between drive and driven shafts, comprising first and second sets of sprockets, each said set including a one said sprocket provided on the drive shaft and a further said sprocket provided on the driven shaft, a first chain extended between and engaged with said first set of sprockets, a second chain extended between and engaged with said second set of sprockets, means associated with the two sprockets provided on at least one of said shafts for relatively changing the rotational position of said two sprockets, and the forward side of one chain and the backward side of the other chain being tensioned.

2. In a chain-type power transmission mechanism for driving connection between generally parallel drive and driven shafts, the improvement comprising a pair of first sprockets mounted on said drive shaft, a pair of second sprockets mounted on said driven shaft, a first endless flexible chain extending between and engaged with one of said first sprockets and one of said second sprockets, a second endless and flexible chain extending between and engaged with the remaining one of said first sprockets and the remaining one of said second sprockets, each of said first and second chains defining thereon a first elongate chain reach which extends between the respective sprockets and is disposed on one side of a plane which passes through longitudinal centerlines defined by the parallel drive and driven shafts, the first elongate chain reaches of said first and second chains being disposed on the same side of said plane, each of said first and second chains defining thereon a second elongate chain reach which extends between the respective sprockets and is disposed on the other side of said plane, and means for drivingly coupling one of the pairs of sprockets to the respective shaft while permitting relative angular adjustment in the position between the sprockets of said one pair for tensioning the first reach of said first chain while tensioning the second reach of said second chain.

3. A mechanism according to claim 2, wherein one of the sprockets of said one pair is non-rotatably fixedly secured to the respective shaft, and releasable bolt means associated with the other sprocket of said one pair for non-rotatably fixing said other sprocket relative to said shaft, said bolt means being releasable to permit said other sprocket to be relatively rotated relative to said one sprocket during initial installation of the chains so that the first reach of said first chain and the second reach of said second chain can be tensioned.

4. A mechanism according to claim 3, including spring means coacting between the sprockets of said one pair for imposing a rotational force tending to relatively angularly move the sprockets of said one pair in opposite directions with respect to one another, and a removable securing means cooperating between the sprockets of said one pair for normally maintaining them in a position spaced from the position assumed by the sprockets under the urging of said spring means, whereby the chains are mounted on the respective sprockets prior to removal of the securing means so that removal of the securing means enables said other sprocket to be angularly displaced by the spring means relative to said one sprocket to appropriately tension the chains, following which the bolt means is tightened to non-rotatably secure said other sprocket to said shaft.

5. A mechanism according to claim 2, wherein one sprocket of said pair is non-rotatably fixedly secured to the respective shaft, and wherein the other sprocket of said pair is coupled to said shaft through a one-way overrunning clutch.

* * * * *